March 5, 1968     J. H. LEMELSON     3,372,263

WELDING APPARATUS

Filed Feb. 7, 1966          2 Sheets-Sheet 1

*INVENTOR.*
JEROME H. LEMELSON

March 5, 1968

J. H. LEMELSON 3,372,263

WELDING APPARATUS

Filed Feb. 7, 1966

INVENTOR.
JEROME H. LEMELSON

United States Patent Office 3,372,263
Patented Mar. 5, 1968

3,372,263
WELDING APPARATUS
Jerome H. Lemelson, 85 Rector St.,
Metuchen, N.J. 08840
Continuation-in-part of application Ser. No. 362,869,
Apr. 27, 1964. This application Feb. 7, 1966, Ser.
No. 525,504
9 Claims. (Cl. 219—80)

ABSTRACT OF THE DISCLOSURE

Welding apparatus is provided which is operative to engage, transfer or manipulate and position a member or assembly with respect to another member or assembly to be welded thereto. In one form of the apparatus, mechanical clamping means are provided for seizing and releasing articles to be welded. In another form, air suction means is used to seize, transfer and position articles to be welded whereafter the suction is released to cause release of the article after it is welded. The apparatus is controlled in its operation by automatic control means which may be operative to control the acts of seizing, moving and prepositioning one article to engage another article, the welding of said articles and the release of the assembly in a predetermined cycle of operation of said apparatus.

---

This invention relates to welding apparatus and is a continuation in part of application Ser. No. 362,869 filed Apr. 27, 1964, for Welding Techniques and Apparatus and having a parent application S.N. 519,014 filed June 28, 1955 both of which are now abandoned.

In the assembly of various metal components, parts to be welded together are frequently prepositioned or assembled by hand in a positioning fixture which is moved or otherwise prepositioned relative to a welding tool operative thereafter to engage and weld the parts together. The procedure is costly insofar as it requires manual labor and is time consuming. This invention is primarily concerned with an improved apparatus which is operative to automatically engage, retain, transfer, preposition, weld and remove welded components from a welding fixture or machine, thereby eliminating labor and effecting such operations in a minimum amount of time. It is accordingly a primary object of this invention to provide an apparatus operative to automatically assemble and weld articles of manufacture.

Another object is to provide apparatus for rapidly assembling and connecting electrical components to form circuits and electrical assemblies thereof.

Another object is to provide an apparatus for automatically or semi-automatically assembling and simultaneously welding articles of manufacture.

Another object is to provide an automatic assembly apparatus which will preposition and rapidly weld pressure weldable metal parts without the distortion or damage frequently resulting from heat generated during conventional welding.

Another object is to provide a simple apparatus for transferring, prepositioning, assembling and welding small components such as electronic components.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIGS. 1' and 2' show further details of apparatus of FIGS. 1 and 2.

Figure 1:
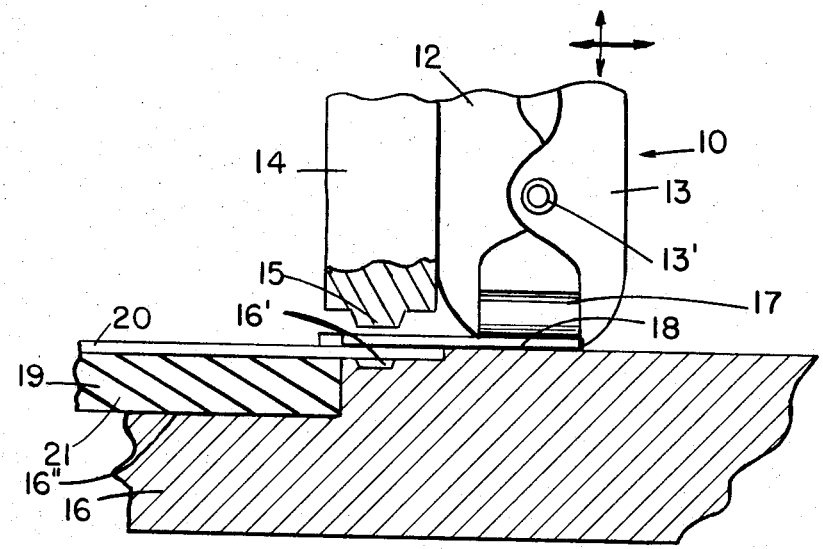
FIG. 1 is a partial side view with parts broken away for clarity of an automatic welding apparatus including part prepositioning and holding means as well as part transfer means.

There is shown in FIG. 1 an apparatus for assembling two or more components to be welded and automatically welding said components. Said apparatus 10 includes a fixture 11 having jaw means which is movable to seize and preposition an article to be welded relative to a second article disposed against a base or bucking member 16. The seizing means includes a pair of jaw members 12 and 13 either or both of which is pivotable on a shaft 13' by means of a power operated device such as a solenoid, electric motor, or fluid cylinder servo 43. Movable in synchronization with the movement of a jaw assembly 11 and its prepositioning of a member 17 to be welded with a second member 19 disposed and prepositioned relative to the base 16, is a welding tool 14 having a welding tip or electrode 15 adapted to engage and effect welding of portions of both said work pieces. In one form of the invention the welding tool 14 and the seizing head 11 are mounted on the same support with the tool 14 being movable in a stroke towards and away from the work assembly relative to the jaw assembly 11. In another form of the invention, the welding tool 14 is provided movable relative to its own mount while the jaw assembly is movable relative thereto on its own support both of which may be supported by the tool bed or means which supports the bucking member 16. In any event, welding tool 14 is movable in a stroke to engage the work members by the operation of its own servo device in synchronization with the operation of the servo device opening and closing the jaws 12 and 13 and prepositioning the assembly 11 thereof relative to the base 16.

In FIG. 1 the components 17 and 19 are illustrated as electrical components. Member 17 has a strip or wire lead 18 which is disposed against a conductor or conducting portion 20 of 19 mounted on an insulating base 21 thereof whereby 18 is prepositioned relative to 20 by means of the transfer device 11 after which the welding tool is operated in a stroke to weld portions of 18 and 20 together.

While the apparatus of FIG. 1 may operate to weld portions of the components held in assembly thereby by means of resistance, ultrasonic, induction or pressure welding means, said apparatus is particularly applicable to the pressure welding of components such as leads of electrical components. Notation 15 refers to a pressure welding tool tip projecting from the end of 14 and notation 16' refers to a cavity in the upper surface of 16 adapted to cooperate with 15 in pressure welding members 17 and 20. Notation 16" refers to a receptacle portion of base 16 so shaped as to preposition the circuit board portion 21 of assembly 19 thereon.

The seizing device 11 is operative to move in a plurality of strokes including one or more first strokes necessary to preposition said clamping device or jaw assembly relative to a component which has been prepositioned to be received and seized thereby and in a second stroke or series of strokes after closure of the jaw members 12 and 13 to grasp the component 17 whereby said component is prepositioned on the base 16 just prior to welding. Thereafter the welding tool head 14 is movable in a stroke to engage and effect welding of the aligned portions 18 and 20 of the components.

Assembly or member 19 may be prepositioned relative to base 16 by any suitable means and may be removed therefrom by the action of the seizing means 11 which is retracted from base 16 along with 14 while clampingly holding 17 to lift the welded assembly off the surface of base 16 after which 11 may be utilized to transfer said assembly to a discharge conveyor prior to prepositioning similar new components against 16 to be welded thereby.

Figure 2:
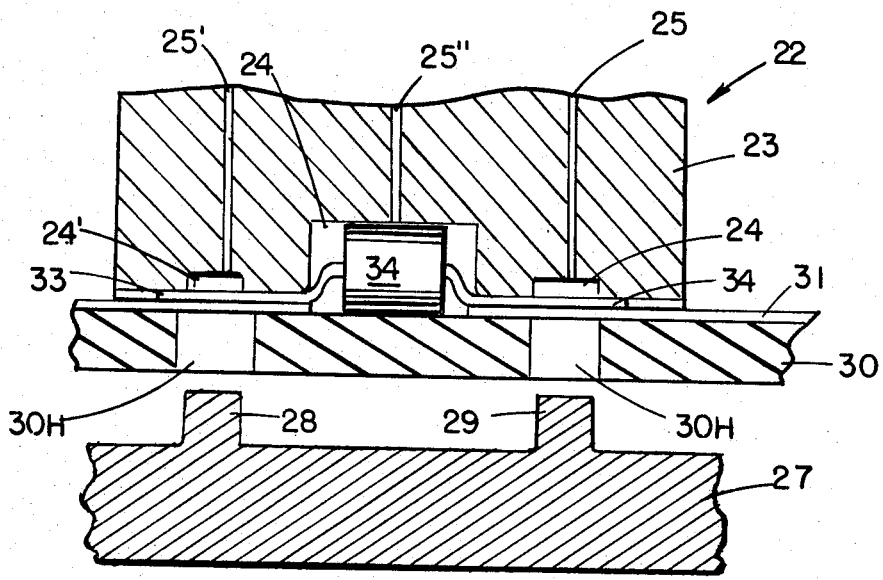
FIG. 2 is a side view in cross section of an automatic welding apparatus which is a modification of that illustrated in FIG. 1.
Figure 1:
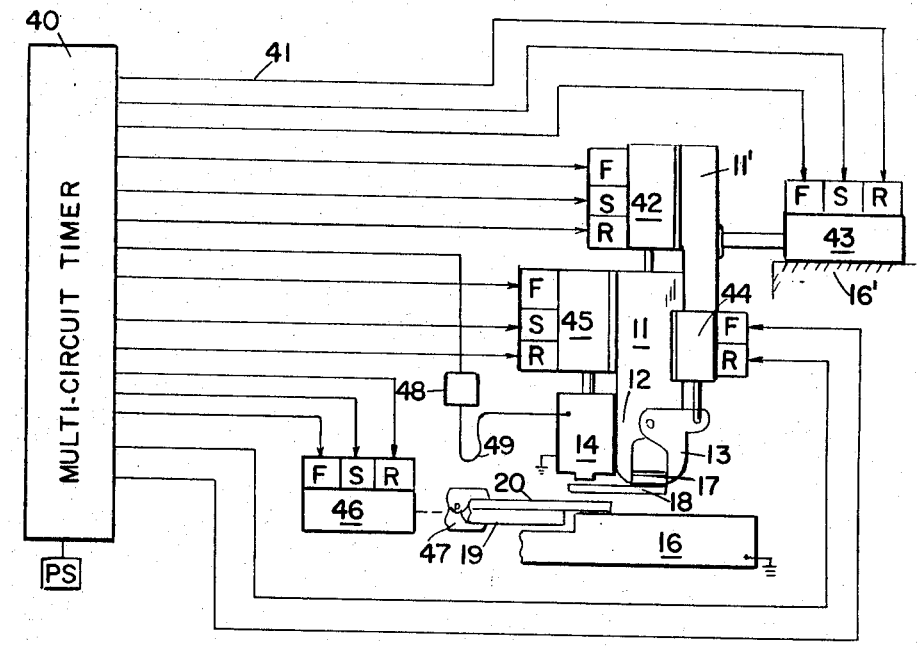
Figure 2:
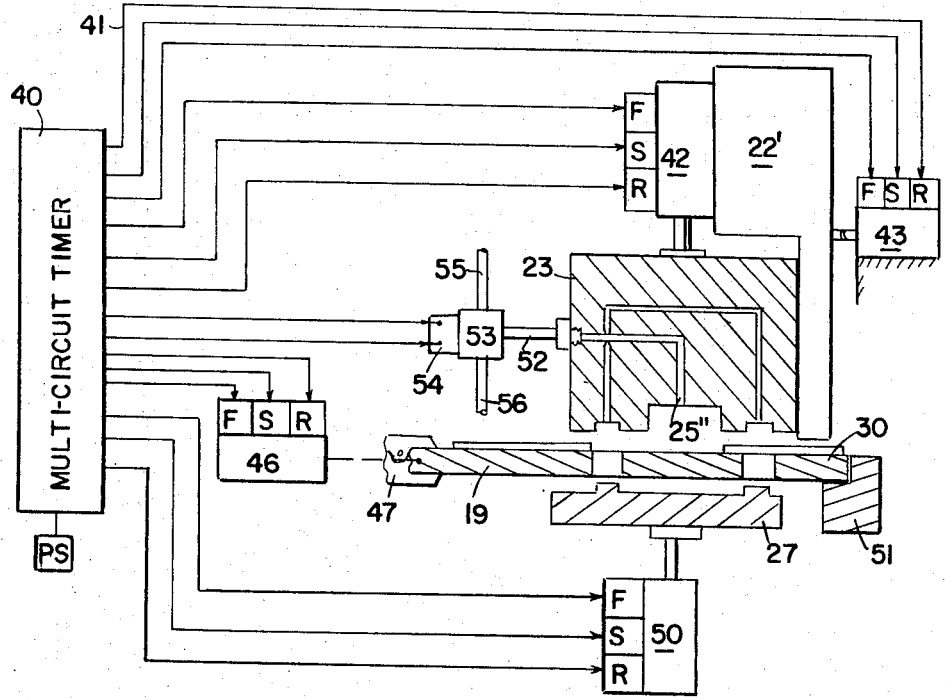

FIG. 2 illustrates a prepositioning and welding apparatus which is a modified form of that illustrated in FIG. 1. The apparatus 22 includes a transfer and prepositioning device 23 which is also operative to cooperate in welding a plurality of components together, one of which components has been prepositioned by means of device 23 relative to the other. The device 23 is shown as a head or block having a cavity 24 shaped in its under surface to conform to one or more articles 32 to be prepositioned thereby relative to a second article 30 to which 32 is to be welded. Like the seizing device 11 of FIG. 1, the head 23 may also be movable in a plurality of strokes by one or more automatically controlled electrical or fluid servo operated motors or devices (not shown) to seize, preposition, weld, further transfer if necessary and release the article or welded assembly.

Whereas in FIG. 1 the prepositioning and transfer means 11 is operative by clampingly engaging the component to be transferred and prepositioned prior to welding, the device 23 of FIG. 2 is operative to seize the component 32 and retain said component thereagainst by means of suction generated in one or more holes or conduits such as 25, 25' and 25" terminating at the wall of the cavity 24 whereby the component or portions thereof are held by atmospheric pressure against the face of the cavity in 23.

In FIG. 2 the component 30 is illustrated as a circuit board having a metal conductor or lead strip 31 secured to its upper surface which is abutted with the leads 33 and 34 of component 32 by the movement of 23, just prior to welding. The article 30 is preferably prepositioned relative to 23 and a second welding tool or head 27 by means of a fixture (not shown).

Upon prepositioning components 30 and 32 as shown, the welding tool 27 is movable so that welding tips 28 and 29 engage the surfaces of electrical strip members 31 and 31' to cooperate with cavities 23' in the head 23 in effecting the pressure welding of the mated metal surfaces. However, the welding head components 23 and 27 may comprise electrodes in a resistance welding circuit and may be operative to electrically resistance weld the components or leads thereof. Notation 30H refers to openings in the circuit board 30 through which the welding tool tips 28 and 29 may pass to engage the under surfaces of the surface mounted strips 31.

Many variations in the design of the welding tools 23 and 27 are possible depending upon the shape of the articles to be welded, the welding process, the means for prepositioning article 30, etc.

Like the apparatus of FIG. 1, the transfer and welding head 23 is preferably movable by means of one or more electrical or fluid powered servos in a plurality of strokes to preposition said head relative to a component to be picked up thereby and to transfer said component to a position whereby at least a portion thereof engages the other article to be welded thereto and, if necessary, in one or more further strokes to transfer the welded assembly from the welding apparatus to a discharge conveyor or further fabricating apparatus. Similarly, welding tool 27 may be movable in one or more strokes under control of its own servos. The operation of the various servos including means for applying vacuum to the passageways 25 and 25' and for energizing the welding heads, if electrical means is utilized to effect welding, are all preferably under the control of a variable program control device such as a presettable multi-circuit self-recycling timer which is energized to start a preset transfer and welding cycle by means of means for sensing the presence of either or both articles to be welded relative to the welding head 23 which sensing means generates a signal to initiate said program control device.

The welding apparatus of FIGS. 1 and 2 may be operative to effect welding of the components illustrated by one or more techniques such as cold pressure welding, electrical resistance welding, ultrasonic welding, etc. In other words, transducers 15 and 27 or 23 may comprise (a) dies specially shaped to weld pressure weldable metal by pressure and deformation alone, (b) electrodes cooperative with grounded members 16 and 23 or 27 to effect resistance welding of the parts assembled therebetween, (c) transducers or tools coupled to transducers for ultrasonically welding components disposed therebetween.

In FIG. 1' is shown auxiliary apparatus as described for operating the welding apparatus 10 of FIG. 1 in a cycle which may be repeated many times or varied in accordance with variations in requirements from one welding job to the next. Notation 40 refers to a multi-circuit cycle controller such as a multi-circuit timer of conventional design, card or tape reader or digital computer having a plurality of output control circuits 41 extending therefrom on which circuits are generated control and/or power supply signals in a predetermined sequence which signals are operative for controlling the various servo motors, solenoids and the like necessary to operate the welding and positioning apparatus described.

Notation 11' refers to a support or mount for the fixture 11 including the jaws 12 and 13, a servo or solenoid 44 operative to open and close said jaws, a lineal actuator servo 42 operative to advance and retract the fixture 11 normal to the surface of the work, a servo 45 operative to advance and retract the welding head 14 and means associated with fixture 11 for guiding said welding head as it advances towards and retracts from the surface of the work. A servo-motor 43 is operative to control movement of the fixture 11' including all of said aforementioned devices mounted thereon in a stroke parallel to the surface of the work or in such a path as to permit the jaws 12, 13 to be positioned over the endmost of a conveyed supply of components 17 to be welded. Notation 46 refers to a servo-motor operative to actuate a prepositioning device 47 such as clamps or jaws holding the member 19 and predeterminately locating same on the bucking member 16. Notation 48 refers to a suitable energy converter or transducer operative when energized by a signal from the controller 40 to provide the proper welding energy to head 14 through a flexible line or coupling 49 provided to account for the movement of head 14 in its stroke towards and away from the work and in any other stroke as defined by operation of servo motor 43. Notations F, S, and R refer respectively to the forward, stop and reverse controls of the various servo-motors which when pulsed, effect the forward projection of the actuator or output shafts thereof, stoppage and reverse travel of same.

In a typical cycle of operation of the apparatus illustrated in FIG. 1', wherein the welding head 14 has just completed welding portions 18 and 20 of components 17 and 19, motor or solenoid 45 is operative to retract head 14 from the work when the reverse control R of 45 is pulsed by a signal from controller 40. Thereafter, power and/or control signals from controller 40 are generated in sequence in accordance with the programming or presetting thereof to effect release of the welded pieces, retraction of the welding head, movement thereof and seizing of a new component 17, repositioning of member 19 to locate a new lead thereon or portion thereof with respect to the welding position or the replacement of member 19 with another member and the operation of devices mounted on fixture 11 to weld the new components thereto. Simultaneously with retraction of head 14, the control R of servo 44 is pulsed opening jaws 12, 13 releasing the welded member 17 whereafter the reverse control R of servo 42 is pulsed retracting fixture 11 from bucking member 16. Reverse control R of servo 43 is next pulsed moving mount 11' to position jaws 12, 13 above a new components whereupon the stop control S of servo 43 is pulsed and the F control of servo 42 pulsed to advance fixture 11 to position the open jaws thereof about the new component. After pulsing stop control S of 42, control F of solenoid 44 is energized causing the jaws to close on the body of the new component. Thereafter control R of servo 42 is energized retracting the fixture 11 with the component held by the jaws and control F of servo 43 is energized to advance fixture base 11' to locate the component over its welding position. Prior to this, servo 46 has been predeterminately operated by sequentially energizing its controls with signals generated by the controller 40 so as to relocate member 19 or replace same with a new member to be welded to the new component.

Upon arriving over the bucking member 16, stop control S of servo 43 is predeterminately activated to properly locate member 17 and the forward drive control F of servo 42 is activated to advance the jaws and member therebetween against the other workpiece 20, whereupon the stop control S of servo 42 is activated. When so located, the next operation includes energizing the forward drive control F of servo 45 to advance welding head 45 against the work and, when engaging same, the welding energy generator 48 is energized for the proper time interval to weld the lead 18 of member 17 to conductor 20 of the member 19. The cycle then repeats or otherwise operates in accordance with the programming of controller 40.

The apparatus of FIG. 2' is similar in most respects to the apparatus of FIG. 1' with the jaw means for seizing and releasing the component replaced by head 23 and the described vacuum holding means therefor. A valve 53 is disposed in the output line 52 of passageways 25, 25' and 25" and is operated by a two way push-pull solenoid to apply either vacuum pressure from a vacuum line 55 for holding the component as described or positive pressure thereto for ejecting said component in accordance with control signals developed on the solenoid as generated by the controller 40 in the proper sequence. Notation 50 refers to a lineal servo having its output shaft connected to advance and retract the welding head 27 underneath the work as described. Servos 42, 43 and 46 operate in sequence to respectively advance and retract head 23, move head 43 parallel the work to reposition same for welding and/or pick up a new component and to replace or reposition the other member 19 to be welded to the member held by head 23. Either welding head 23 or 27 may also be energized as described by a suitable transducer for effecting resistance, ultrasonic or other forms of welding other than pressure welding. The multi-circuit controller 40 is operative to effect control of all the servos of FIG. 2' in the proper sequence and for proper time intervals to effect the necessary movements of head 23, head 27 and work 19 as well as the gating of vacuum pressure to hold the components against the head during its transfer and welding operations. Notation 51 refers to a base for supporting and predeterminately positioning the circuit board or device 19 and functions in a manner similar to the base 16 of FIG. 1'.

I claim:
1. Welding apparatus comprising in combination:
   (a) first means for seizing and releasing a first article and adapted for predeterminately retaining said first article,
   (b) welding means associated with said first means and including a welding head,
   (c) means for guiding said welding head in a path relative to said first means,
   (d) power means for driving said welding head in a stroke along said path to engage a portion of the work held by said first means,
   (e) a base,
   (f) means for predeterminately positioning said first means and said base,
   (g) means for predeterminately positioning a second article on said base,
   (h) means for controlling said power means to cause the welding head to advance said first article against said second article and to compress said two articles together,
   (i) means for welding the two articles together,
   (j) means for operating said first means to release said first article, and
   (k) means operative upon release of said first article for retracting said first means from said base and said welding head from said articles to release the welded assembly.

2. Welding apparatus in accordance with claim 1 wherein said first means includes a clamping means operative to seize said first article by compressing same and to release said first article upon the completion of welding it to said second article.

3. Welding apparatus in accordance with claim 2 wherein said clamping means comprises a movable assembly of jaws and a power means for causing same to open and close.

4. Welding apparatus in accordance with claim 1 wherein said first means includes vacuum operated means for seizing and releasing said first article.

5. Welding apparatus in accordance with claim 1 wherein said means for predeterminately positioning said second article on said base includes power operated means for said positioning means and sequential control means for said means for seizing and releasing said first article and said means for positioning said second article.

6. Apparatus in accordance with claim 1 including means for moving said first means in a plurality of strokes to move same across said base for moving articles held thereby to different locations relative said base and varying the position of said welding means relative to said base.

7. Apparatus in accordance with claim 6 including program control means for controlling movement of said first means, the operation of said seizing and releasing means and said welding means to define a welding cycle.

8. Apparatus in accordance with claim 1 including power operated means for moving and locating said second article on said base, electrically operated energizing means for said welding means for generating welding radiant energy, controls for said power operated means and said energizing means and sequential control means connected to said controls to cause said first means to seize said first article, preposition same, locate said second article in engagement with said first article, operate said welding means, operate said first means to release said article and operate said power means to remove said welded first and second articles from said base.

9. Apparatus in accordance with claim 1, said means for welding the two articles together comprising cooperating pressure-welding dies.

References Cited

UNITED STATES PATENTS

| 2,606,268 | 8/1952 | Pityo et al. | 219—103 X |
| 3,081,396 | 3/1963 | Johnson et al. | 219—79 |
| 3,100,830 | 8/1963 | Hagner | 219—79 |
| 3,161,753 | 12/1964 | Schnick | 219—79 |
| 3,294,950 | 12/1966 | Hagner et al. | 219—103 |

RICHARD M. WOOD, *Primary Examiner.*

B. A. STEIN, *Assistant Examiner.*